Oct. 22, 1940.   R. T. WHITNEY   2,218,601
BRAKE MECHANISM
Filed June 30, 1939   2 Sheets-Sheet 1
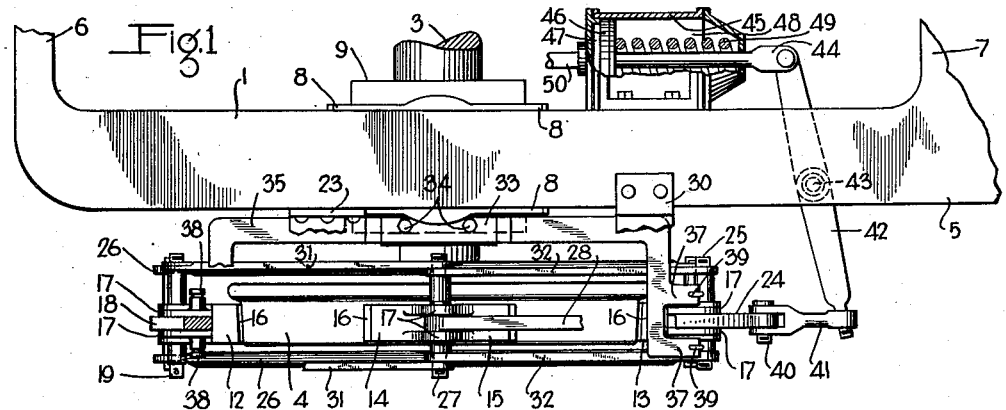
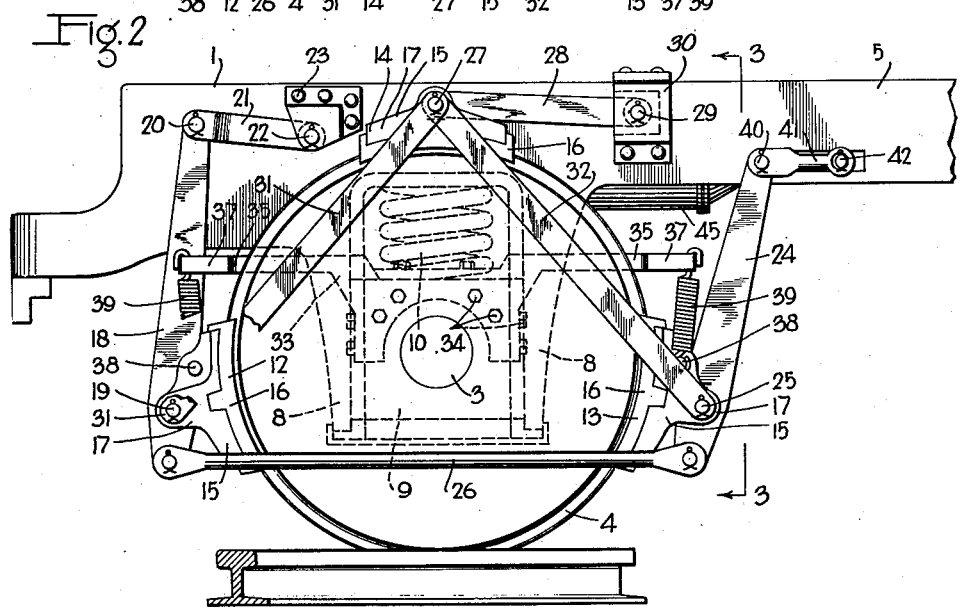
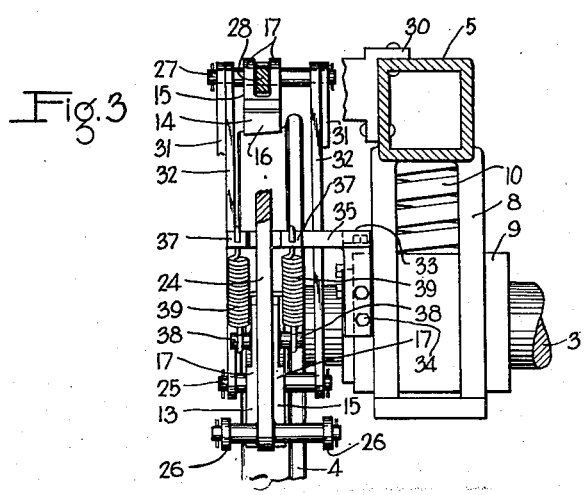
INVENTOR
RALPH T. WHITNEY
BY
ATTORNEY Oct. 22, 1940. R. T. WHITNEY 2,218,601
BRAKE MECHANISM
Filed June 30, 1939 2 Sheets-Sheet 2
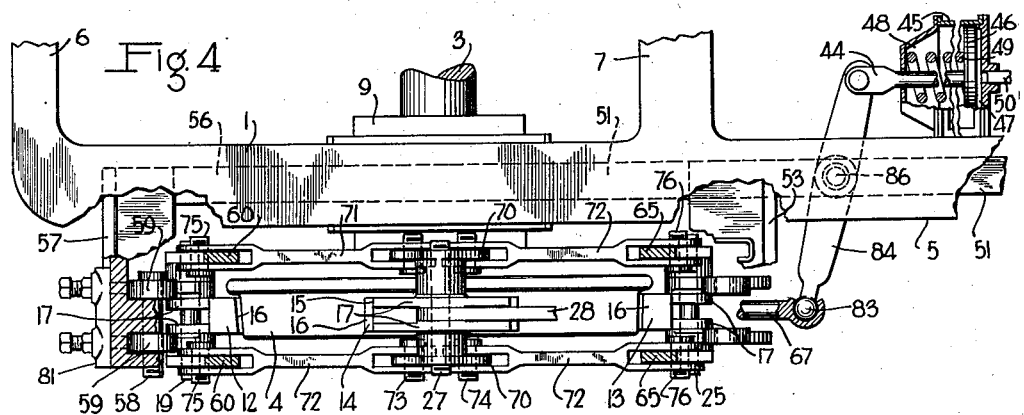
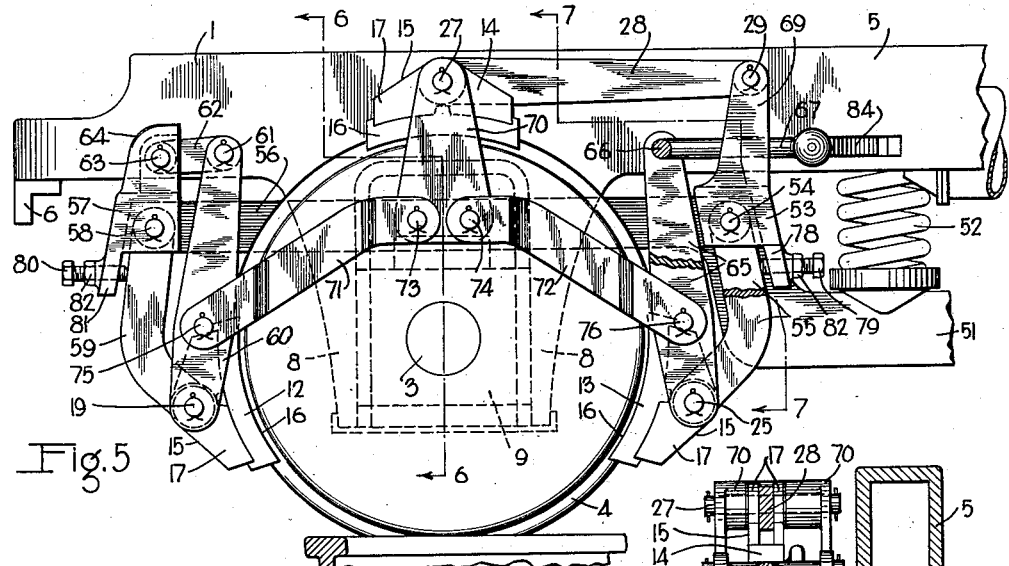
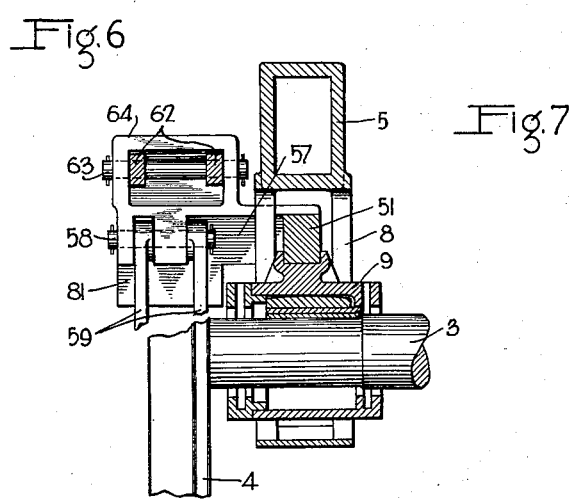
INVENTOR
RALPH T. WHITNEY
BY
ATTORNEY Patented Oct. 22, 1940

2,218,601

UNITED STATES PATENT OFFICE 2,218,601

BRAKE MECHANISM

Ralph T. Whitney, Irwin, Pa., assignor to The Westinghouse Air Brake Company, Wilmerding, Pa., a corporation of Pennsylvania Application June 30, 1939, Serial No. 282,005

24 Claims. (Cl. 188—56)

This invention relates to brake mechanism and more particularly to the general type disclosed in the pending application of Carlton D. Stewart Serial No. 214,517, filed June 18, 1938, now Patent No. 2,177,953, dated Oct. 31, 1939, which is assigned to the assignee of this application and which embodies a plurality of brake elements arranged in clasp relation at opposite sides of a wheel and axle assembly and one or more additional brake elements disposed above said assembly and cooperative with said clasp arranged elements for braking said assembly.

In the brake mechanism disclosed in the above referred to application all of the brake elements are connected to a relatively long, heavy beam which extends longitudinally of the truck frame. One end of this beam is pivotally connected to the truck frame while a spring acts on the opposite end to support the beam and thereby the several brake elements from the truck frame when said brake elements are in their release position.

The clasp arranged brake elements are so disposed as to engage the wheel and axle assembly below the horizontal center-line thereof so that when forced against said assembly, in effecting an application of the brakes, said brake elements will be moved downwardly around the assembly to a certain degree and in so moving will rock the beam about its pivotal connection with the truck frame and thus pull the additional brake element or elements located above the assembly and carried by the beam into braking engagement with said assembly.

The additional brake element or elements then act through the beam to support the clasp arranged elements in braking relation with the wheel and axle assembly, while the beam acts to hold the several brake elements against turning with said assembly.

The braking operation of the several brake elements above described is therefore entirely independent of the truck frame except for the torque connection therewith for holding said elements against turning while braking, so that vertical movement of the truck frame relative to the wheel and axle assembly has substantially no effect upon the action of the brake mechanism, and conversely, the braking action of said mechanism has substantially no effect upon the springing of the truck frame.

In trucks such as are employed under modern railway vehicles having low centers of gravity there is little available space for the installation of brake mechanisms, and on certain trucks it might even be impossible to install a brake mechanism which included a long heavy beam, such as above described. One object of the present invention is therefore to provide a novel brake mechanism of the above general type in which the need for such a beam is obviated.

Since in the brake mechanism disclosed in the aforementioned Stewart application the brake element located above the wheel and axle assembly is carried by and movable with the truck frame when said element is in its release position, it will be evident that the clearance space between said element and the wheel and axle assembly, when the element is in its release position with respect to the truck frame, will vary with movement of the truck frame from a required degree in a fully loaded condition to an excessive degree when the truck frame is in the condition assumed when the vehicle carried thereby is empty. Another object of the invention is therefore to provide a novel brake mechanism of the above general type in which the release position of the brake element located above the wheel and axle assembly is independent of vertical movement of the truck frame relative to said assembly, so as to thereby obviate the undesirable condition just described.

A more specific object of the invention is to provide a novel brake mechanism of the general type disclosed in the aforementioned Stewart application which embodies the advantages thereof but in which the disadvantages above enumerated are obviated.

Another object of the invention is the provision of an improved brake mechanism of the above general type and support means therefor which is entirely independent of the truck frame so that at no time will the brake mechanism or frame have any material influence on each other.

Another object of the invention is to provide an improved multi-shoe brake mechanism of the above general type which is supported from an unsprung part of a truck when in its brake release condition and from the wheel and axle assembly when operating to brake said assembly.

A still further object of the invention is the provision of a novel brake mechanism such as above described which is resiliently supported from an unsprung portion of the truck, and therefore independently of the truck frame, when in its brake release condition, and from the wheel and axle assembly when operating to brake said assembly and which is therefore at all times substantially independent of the loaded condition of the truck and therefore independent of the vertical position which the truck frame may assume at different times.

Other objects and advantages will be apparent from the following more detailed description of the invention.

In the accompanying drawings Fig. 1 is a plan view, partly in section, of a portion of a railway vehicle truck and a novel brake mechanism embodying one form of the invention; Fig. 2 is a side elevational view of same; Fig. 3 is a sectional view taken on the line 3—3 in Fig. 2; Figs. 4 and 5 are views similar respectively to Figs. 1 and 2 but illustrating another form of the invention; and Figs. 6 and 7 are sectional views taken respectively on the lines 6—6 and 7—7 in Fig. 5.

*Description of the brake mechanism shown in Figs. 1 to 3 of the drawings*

The form of the invention illustrated in Figs. 1 to 3 of the drawings is shown associated with the railway vehicle truck for the purpose of illustration, which truck may comprise the usual truck frame 1 and longitudinally spaced wheel and axle assemblies each of which may comprise an axle 3 and laterally spaced wheels 4 secured in any desired manner to the axle 3 for rotation therewith.

The truck frame 1 comprises side pieces 5 disposed between the wheels 4 and integrally connected together by transversely extending end members 6 and transoms 7. The side pieces 5 are provided adjacent each wheel 4 with the usual spaced, depending pedestals 8 between which is slidably mounted a journal bearing 9 journaled on the axle 3. A spring 10 is interposed between each journal bearing 9 and side piece 5 for resiliently supporting the truck frame 1.

Each wheel and axle assembly of the truck may be provided with two brake mechanisms and both of these brake mechanisms may be substantially identical to each other and operate in the same manner. In view of this and for the sake of simplicity, only one such brake mechanism and the necessary portions of one wheel and axle assembly and of the truck frame are therefore shown in the drawings.

The brake mechanism shown in Figs. 1 to 3 in the drawings comprises a plurality of friction brake elements 12, 13 and 14 arranged in circumferentially spaced relation with respect to each other around a rotatable member to be braked, which member in the present embodiment of the invention is preferably the wheel 4 of the truck. The brake elements 12 and 13 are arranged in clasp relation at opposite sides of the wheel 4 with the longitudinal centers of their braking faces disposed below the horizontal center-line of the wheel, while the brake element 14 is located above the wheel on the vertical center-line thereof.

Each of the brake elements 12, 13 and 14 may be of usual structure comprising a brake head 15 provided on its outer face with parallel supporting flanges 17 extending longitudinally thereof. A brake shoe 16 is removably secured to the opposite face of each of the brake heads in operating alignment with the tread of the wheel 4 for frictionally engaging said tread to brake said wheel.

A dead brake lever 18 is disposed to work in the space between the flanges 17 of the brake element 12 and is secured intermediate its ends to said flanges by a pivot pin 19. The upper end of this lever is pivotally connected by a pin 20 to one end of a tension link 21 the opposite end of which is pivotally connected to a pin 22 secured in a bracket 23 projecting from the side piece 5 of the truck frame. At the opposite side of the wheel 4 a live lever 24 is provided to operate between the flanges 17 of the brake element 13 and is pivotally connected intermediate its ends to said flanges by a pin 25. The lower ends of the dead and live levers 18 and 24 are operatively connected together by a pair of spaced, parallel tie rods 26 disposed at opposite sides of the wheel 4.

The brake element 14 located above the wheel 4 is pivotally connected by a pin 27 to one end of a rigid torque element 28 the opposite end of which is connected by a pin 29 to a bracket 30 projecting from the side piece 5 of the truck frame.

At each of the opposite sides of the wheel 4 there is provided a pair of oppositely disposed, diagonally extending rigid bars 31 and 32 having their upper ends pivotally connected to the pin 27 secured to the brake element 14. The lower ends of the bars 31 at both sides of the wheel 4 are rockably connected to pivot pin 19 at the opposite sides of the flanges 17 of the brake element 12, while the lower ends of the bars 32 are similarly connected to the pivot pin 25 secured in the brake element 13.

A bracket 33 is interposed between the wheel 4 and side piece 5 of the truck frame. This bracket straddles the top of the journal bearing 9 outside of the side piece of the truck frame and is rigidly connected to said bearing by bolts 34.

The bracket 33 is provided at each side of the journal bearing 9 with a portion 35 which extends parallel to the side piece 5 of the truck frame to a point beyond the adjacent portion of the tread of wheel 4, at which point each of the portions 35 is bent outwardly over the tread of the wheel and is provided at its end with two arms 37 extending in a direction away from the wheel.

The arms 37 of the two bracket portions 35 are so spaced as to extend over a pair of oppositely disposed lugs 38 projecting from the opposite faces of flanges 17 of the brake elements 12 and 13 and in the end of each of said arms there is secured in any desired manner, as by hooking, the upper end of a hanger or support spring 39. The lower end of each of these springs is connected to one of the lugs 38.

It will be noted that there are two support springs 39 provided for each of the brake elements 12 and 13 and that the ends of the arms 37 are so located with respect to said brake elements that the springs 39 are inclined outwardly slightly from the wheel so that the action of gravity on said elements will effect movement of the brake elements from the wheel 4 to their release positions, shown in the drawings.

The hanger springs 39 are provided to resiliently support the brake elements 12 and 13 from the journal bearing 9, which is an unsprung part of the truck, and to act through said elements and the bars 31 and 32 connected to the brake element 14 for supporting the same in its release position, as shown in the drawings. It will be noted that the space between the arms 37 adjacent the dead brake lever 18 provides for operation of said lever between said arms.

The brake mechanism above described is wholly independent of the truck frame except for the connections through the horizontally extending links 21 and 28 as will now be evident, and its operation may be controlled by apparatus which will now be described.

The upper end of the live brake lever 24 is pivotally connected by a pin 40 to one end of a link 41 the opposite end of which is provided with an opening through which extends one end of a brake lever 42. This lever may extend through a suitable opening in the side piece 5 of the truck frame wherein its may be pivotally connected to said side piece by a pin 43. The opposite end of the brake lever 42 is connected to a piston rod 44 of a brake cylinder device 45 which may be mounted on any suitable part of the truck such as against the inner face of the side piece 5 of the truck frame.

The brake cylinder device 45 comprises a piston 46 having at one side a pressure chamber 47 and at the opposite side a non-pressure chamber 48 through which the piston rod 44 extends connecting the brake cylinder piston 46 to the brake lever 42. A release spring 49 provided in the non-pressure chamber 48 acts on the brake cylinder piston 46 for urging it to its release position shown in the drawings. The pressure chamber 47 is connected to a brake cylinder pipe 50 through which fluid under pressure is adapted to be supplied to and released from said chamber for controlling reciprocation of the brake cylinder piston 46 and thereby operation of the brake mechanism to apply and release the brakes on the wheel 4 as will be later described.

From the above description it will be apparent that with the various parts of the brake mechanism in their release positions shown in the drawings, said mechanism is supported entirely through the springs 39 from the journal bearing 9 which is unsprung and upon which the truck frame 1 is spring supported. The only connections between the brake mechanism and the truck frame are through the link 21, which serves as an anchor for the upper end of the dead lever 18 through the torque arm 28 and the brake cylinder link 41, but it will be noted that these links and the torque arm are so arranged that forces applied thereto during braking, which will be later described, are adapted to act in a generally horizontal direction so as to thereby not interfere to any material degree with free movement of the truck frame in a vertical direction relative to the brake mechanism.

*Operation of the brake mechanism shown in Figs. 1 to 3 of the drawings*

With the several brake elements 12, 13 and 14 released from the tread of wheel 4 and supported from the journal bearing 9 by the springs 39, the truck wheel 4 is free to rotate, as will be evident.

If it is desired to effect an application of the brakes on the wheel 4, fluid under pressure is supplied through the pipe 50 to the pressure chamber 47 in the brake cylinder device 45. After this pressure becomes sufficient to overcome the pressure of the release spring 49 on the brake cylinder piston 46 it then moves said piston in the direction of the right hand and rocks the brake lever 42 in a clockwise direction and through the medium of link 41 effects rocking of the brake lever 24 in a counterclockwise direction, as viewed in Figs. 1 and 2.

This movement of the live brake lever 24 initially acts through the pin 25 to move the brake element 13 into engagement with the tread of the wheel 4 and through the tie rods 26 on the dead brake lever 18 to effect movement of the brake element 12 into engagement with the tread of said wheel at the opposite side thereof.

Since the elements 12 and 13 are thus moved into engagement with the tread of wheel 4 below the horizontal center-line of said wheel, and also due to the fact that the line of force applied to said elements passes below the axis of the wheel 4, further pressure of the brake cylinder piston 46 applied to said brake elements forces said elements downwardly around the wheel toward each other. This downward movement of the brake elements 12 and 13 acts through the bars 31 and 32 on the pin 27 to effect movement of the brake element 14 in a downwardly direction into engagement with the top portion of wheel 4, such movement of the several brake elements into engagement with the wheel being opposed by the support springs 39, which however are extensible to provide for such operation.

After the brake element 14 is moved into contact with the wheel 4 it is pulled against said wheel with a force equal to the combined downward pull of the clasp arranged brake elements 12 and 13 on the bars 31 and 32 and thus provides braking of the wheel which is in addition to that provided by the brake elements 12 and 13.

It will be noted that the force applied to the brake element 14 through the bars 31 and 32 from the brake elements 12 and 13 is a component of the actuating force applied by the brake cylinder piston 46 to the elements 12 and 13 due to the elements 12 and 13 being located below the horizontal center-line of the wheel and also due to the direction of action of the force applied to the elements 12 and 13. The degree of pressure between the upper brake element 14 and the wheel therefor depends upon the downward pull of the brake elements 12 and 13, whereas the degree of braking effected by the elements 12 and 13 depends upon the pressure of fluid supplied to act on the brake cylinder piston 46. The degree of braking obtained on the wheel 4 is therefore equal to the sum of the braking effects of each of the several brake elements and may be varied by varying the pressure of fluid supplied to act in the brake cylinder device, in the usual well known manner.

When the brakes are applied, as just described, it will be evident that the weight of the brake mechanism is entirely carried by the wheel 4 independently of the truck frame. It will also be noted that the downward movement of the several brake elements into engagement with the wheel actuates the link 21 and torque arm 28 to a substantially horizontal position so that force applied therethrough to the truck frame will have substantially no effect upon free vertical movement of the frame relative to the wheel 4 while the brakes are applied.

The torque arm 28 acts when the brakes are applied to hold the brake element 14 against turning with the wheel 4 and since it thus anchors the upper end of the bars 31 and 32 the brake elements 12 and 13 are also secured thereby against rotation with the wheel.

When it is desired to effect a release of the brakes after an application, the fluid under pressure is vented from the brake cylinder piston chamber 47 by way of pipe 50 and when such pressure is reduced to a sufficient degree, the release spring 49 acting on the brake cylinder piston 46 moves said piston back to its release position, shown in the drawings.

This movement of the brake cylinder piston 46 turns the brake lever 42 in a counterclockwise direction which in turn effects movement of the upper end of the live brake lever 24 in a direction away from the wheel 4. This operation of the live lever 24 acts to move the brake element 13 away from the wheel 4 and also acts through the tie rods 26 to operate the dead brake lever 18 to move the brake element 12 away from said wheel. As the brake elements 12 and 13 are thus moved away from the wheel, the supporting springs 39 act to lift said elements back to their release position during which movement said springs also act through the bars 31 and 32 to lift the brake element 14 away from the wheel 4 and back to its release position, in which release positions said elements are adapted to be carried to provide for free rotation of the wheel 4 until a subsequent application of the brakes is effected.

After the several brake elements are thus returned to their release positions, it will be noted that said elements and the live and dead brake levers and the connecting bars 31 and 32 are again resiliently supported from the unsprung journal bearing 9.

It will now be evident that at no time is the truck frame 1 subjected to the weight of the brake mechanism so that said frame is capable of movement relative to the wheel 4 in a vertical direction independently of said mechanism at all times.

*Description of the brake mechanism shown in Figs 4 to 7 of the drawings*

This embodiment of the invention is shown associated with a vehicle truck of the type having an equalizer bar 51 extending parallel to and disposed below the side frame 5 with the end of said equalizer bar supported directly on the top of the journal bearing 9. This equalizer bar supports a spring 52 upon which the truck frame 1 is resiliently supported. This construction is so well known that a further description thereof is not deemed essential.

According to the invention, the equalizer bar 51 is provided at the side of wheel 4 adjacent the longitudinal center of the truck, with a support bracket 53 extending outwardly from the bar to a point in line with but spaced away from the tread of said wheel. In the outer end of this bracket there is provided a pivot pin 54 to which the upper end of a pair of hangers 55 are pivotally connected. The lower ends of these hangers are disposed at the opposite sides of the brake element 13 and are pivotally connected to the pin 25 secured in the flanges 17 of said brake element whereby said brake element is supported from the equalizer bar 51, which is an unsprung part of a vehicle truck.

The equalizer bar 51 is provided with an extension 56 which projects in the direction of the end piece 6 of the truck frame and past the tread of the wheel 4 where it is provided with an outturned bracket 57 similar to but disposed opposite to the bracket 53. The bracket 57 is provided with a pivot pin 58 upon which is mounted the upper ends of a pair of hangers 59 the lower ends of which are disposed at opposite sides of the brake element 12 and are pivotally connected to the pin 19 secured in the flanges 17 of said brake element. The brake element 12 is thus also supported through the medium of hangers 59 from the equalizer bar 51 which is an unsprung portion of the vehicle truck.

It will be noted that the pivotal connections between the hangers 55 and 59 and the equalizer bar 51 are so arranged with respect to the brake elements 12 and 13 that the action of gravity on said elements is adapted to effect movement thereof in a direction away from the tread of the wheel 4.

A dead lever 60 is provided adjacent the outer face of each of the hangers 59, the two dead levers having their lower ends fulcrumed on pin 19 secured in the brake element 12 and their upper ends pivotally connected by a pin 61 to one end of each of a pair of links 62 the opposite ends of which are pivotally connected to a pin 63 secured in an upstanding portion 64 of the bracket 57 which projects outwardly from the equalizer bar 51. At the opposite side of the wheel 4 there are provided a pair of oppositely disposed, like, live brake levers 65 pivotally connected at their lower ends to the pin 25 in the brake element 13 and at the opposite sides thereof. The upper ends of the two live brake levers 65 are pivotally connected to the opposite ends of a T-shaped head 66 of a tension rod 67.

The brake element 14 located above the wheel is provided with a pivot pin 27 to which one end of a torque element 28 is connected, as hereinbefore described in connection with the structure shown in Figs. 1 to 3 of the drawings. The opposite end of this torque element 28 is connected to a pin 29 which is secured in an upstanding portion 69 of the bracket 53 projecting from the equalizer bar 51.

At each of the opposite sides of the brake element 14 and wheel 5 there is provided a depending link 70. The upper ends of the two links 70 are pivotally connected to the pin 27, while to the lower end of each of said links there is pivotally connected by pins 73 and 74, respectively, the upper ends of two oppositely disposed diagonally extending links 71 and 72; one set of links 70, 71 and 72 being provided at each si e of the wheel 4, as clearly shown in the drawin_s. The opposite or lower end of the link 71 at each side of wheel 4 is pivotally connected by a pin 75 to the adjacent dead brake lever 60 above the connection thereof with the brake element 12, while the opposite and lower end of the link 72 at each side of wheel 4 is connected by a pin 76 to the adjacent live brake lever 65 above the connection with the brake element 13.

The links 70, 71 and 72 at each side of wheel 4 constitute a toggle the opposite ends of which are connected to the dead and live brake lev°rs 60 and 65, while the knee of each toggle is c( n-nected through the pin 27 to the brake elem/ ⸱ 14 disposed above the wheel 4.

Depending from the bracket 53 is a lug 78 a1 d screw-threaded into this lug in line with :.e outer edges of the two hangers 55 are a pair of adjusting screws 79.

A pair of like screws 80 are provided in a lug 81 depending from the bracket 57 and in line with the outer edges of the hangers 59. The adjusting screws 79 and 80 are provided for engagement with the hangers 65 and 59, respectively, upon movement of the brake elements 12 and 13 away from the tread of wheel 4 to define the clearance space between said elements and tread, and by proper adjustment of said screws said clearance space may be adjusted to any desired degree. A lock nut 82 is provided on each of the screws 79 and 80 for securing said scre⸱ in an adjusted position.

The operation of the brake mechanism s] .n in Figs. 4 to 7 of the drawings is adapted ι ›e controlled through the tension rod 67 which is provided in the end opposite the T-shaped head 66 with a socket in which there is disposed to operate a ball 83 which is provided on one end of a brake lever 84. This lever may extend in a direction transversely of the truck through a suitable opening in the side piece 5 wherein it may be pivotally connected to said side piece by a pin 86. The other end of brake lever 84 is pivotally connected to the piston rod 44 of the brake cylinder device 45 which may be secured to the inside of the side piece 5 of the truck frame.

The brake cylinder device 45 may be of the same construction as that shown in Fig. 1 of the drawings, comprising a brake cylinder piston 46 having at one side a pressure chamber 47 connected to a pipe 50 and having at the opposite side a non-pressure chamber 48 through which the piston rod 44 connected to the piston 46 extends, and which contains a release spring 49 for urging the brake cylinder piston to its release position in which it is shown in the drawings.

*Operation of the brake mechanism shown in Figs. 4 to 7 of the drawings*

Assume that the several parts of the brake mechanism are in their release position, as shown in the drawings, in which position the brake elements 12, 13 and 14 are all spaced away from the tread of the wheel 4 so that said wheel is free to rotate.

Now if it is desired to brake the wheel 4, fluid under pressure is supplied through the pipe 50 to the pressure chamber 47 in the brake cylinder device and therein acts on the brake cylinder piston 46 to effect movement thereof in the direction of the left hand to thereby rock the brake lever 84 in a counterclockwise direction about its pivot 86, as viewed in Fig. 4 of the drawings. This movement of the brake lever 84 is transmitted through the rod 67 to the live brake levers 65 and acts to rock said levers in a clockwise direction as viewed in the drawings. The initial rocking movement of the live levers 65 is about the pin 25 carrying the brake element 13 and thus acts to move the pins 76 connected to the toggle links 72 away from the pins 75 connected to the toggle links 71. As the ends of the toggle links 72 and 71 are thus moved apart the brake element 14 is lowered by gravity into engagement with the tread of the wheel 4 and then acts to prevent further downward movement of the toggle pins 73 and 74 provided at the knees of the toggles.

After the brake element 14 is thus lowered into engagement with the tread of the wheel 4 the pins 76 at the one end of the toggle links 72 become the fulcrums for the live levers 65 so that further rocking movement of said levers in a clockwise direction rocks the hangers 55 about the pivot pin 54 in such a direction as to move the brake element 13 into engagement with the wheel 4. After the brake element 13 is moved into contact with the wheel the pivot pin 25 again becomes the fulcrum for the live levers 65 so that further movement of said levers by continued operation of the brake cylinder device then acts through the toggle links 72, 70 and 71 and the connecting pins, on the pins 75 connecting the links 71 to the dead levers 60. The force thus applied to the pins 75 then rocks the dead levers 60 about their fulcrum connections with the bracket 64 through the links 62 in such a direction as to swing the hangers 59 toward the wheel 4 for thereby moving the brake element 12 into engagement with the tread of said wheel.

After the brake elements 12, 13 and 14 are thus all moved into contact with wheel 4 the pressure applied by the brake cylinder piston 46 to the live levers 65 acts through the toggle links 72, 70 and 71 to force the several brake elements into braking engagement with the tread of the wheel 4 to effect braking thereof. The degree of this force depends upon the pressure of fluid supplied to act on the brake cylinder piston 46, which pressure may be varied in the usual manner to provide any desired degree of braking of the wheel.

It will be evident that the pressure with which the brake element 13 is forced against the wheel is governed by the moment arms of the live levers 65 at either side of the pins 76. Substantially the same degree of pressure as applied to the pins 76 for forcing the brake element 13 into engagement with the wheel is transmitted through the toggle links 72, 70 and 71 to the pins 75 for operating the dead levers 60 to force the brake element 12 into engagement with the wheel, and assuming that the movement arms of said dead levers are the same as of the live levers, the brake element 12 will be forced into engagement with the wheel with the same degree of force as the brake element 13. In other words, the toggle transmits substantially the same pressure for operating the brake element 12 as provided for operating the brake element 13.

The vertical component of the pressure applied to the opposite ends of toggle links 72 and 71 is transmitted through the links 70 to the pin 27 for forcing the brake element 14 into braking engagement with the top of the wheel 4. This component of force of course depends upon the angularity of the oppositely disposed toggle links 72 and 71, the same as in any toggle mechanism. The angularity of the particular construction shown in the drawings is governed mainly by the length of the links 70 which however may be such as to provide any desired degree of braking of the brake element 14. The length of the links 70 may if desired be such as to obtain the same degree of braking from the element 14 as obtained from the elements 12 and 13, assuming that the brake mechanism is so arranged that both of the elements 12 and 13 brake equally. It will of course be understood that the degree of braking provided by the brake element 14 is a function of the angle between the toggle links 71 and 72.

Due to the fact that the clasp brake elements 12 and 13 engage the wheel 4 below the horizontal center-line thereof, and also to the fact that the actuating force applied to said elements acts in a direction an extension of which is disposed below the axis of wheel 4, said clasp brake elements tend to be forced downwardly around the wheel in effecting an application of the brakes in the same manner as occurs in conventional type of brake rigging and which in conventional type of brake rigging results in a reduction of the effectiveness of the brakes for a certain actuating pressure. Such downward movement of the clasp brake elements 12 and 13 is however prevented in the present construction since the brake element 14 acts through the toggle links 70, 71 and 72 to support the clasp brake elements 12 and 13 in substantially the same position relative to the wheel 4 as obtained upon initial engagement with said wheel. A certain degree of the downward pull of the clasp brake elements 12 and 13 during braking may be taken by the hangers 55 and 59 but the major portion is transmitted through the toggle links to and thus taken by the brake element 14 engaging the top of the wheel as just described. In this connection it will be noted that in the structure shown in Figs. 1 to 3 and above described, the reduction in effectiveness of the brake elements 12 and 13 due to their movement downwardly around the wheel 4 is offset by and acts to increase the effectiveness of the brake element 14 and is not thus lost insofar as actual braking is concerned as occurs in conventional types of brake riggings.

When the brakes are applied the torque arm 28 acts to hold the brake element 14 against rotative movement with the wheel 4 and acting through the toggle links 70, 71 and 72 also holds the brake elements 12 and 13 against turning with the wheel 4, as will be apparent. The hangers 55 and 59 also act to accomplish this same end, but when the brake elements are in braking engagement with the wheel 4, said hangers serve no useful purpose. The only function of the hangers is to support the brake elements when the brakes are released, as will now be described.

In order to effect a release of the brakes after an application the fluid under pressure is released from the brake cylinder pressure chamber 47, and when said pressure is reduced sufficiently, the release spring 49 acts to move the brake cylinder piston 46 back to its release position as shown in the drawing. This movement of the brake cylinder piston acts through the push rod 44, brake lever 84 and link 67 to first release pressure on the brake mechanism and to then rock the live brake levers 65 in a clockwise direction back to their release position shown in the drawings.

As the live levers 65 are thus moved the clasp brake elements 12 and 13 swing away from the wheel 4 due to the action of gravity until the hangers 55 and 59 engage the adjusting screws 79 and 80, respectively, which define the release positions of said elements.

After the brake elements 12 and 13 are thus moved to their release positions, further release movement of the live levers 65 by the brake cylinder release spring 49 moving the brake cylinder piston back to its release position acts through the toggle links 72, 71 and 70 to elevate the brake element 14 to its release position disengaged from the wheel 4, as shown in the drawings, said position being obtained upon completion of the release movement of the brake cylinder piston. The wheel 4 is now free to rotate.

From the above description of the parts and operation of the second embodiment of the invention it will be evident that the support and operation of the brake mechanism is independent of the truck frame 1, except for the connections through the anchor links 62 for the dead levers 60, the torque arm 28 for the brake element 14 and the brake cylinder connecting link 67, but these connections are so arranged that any force applied to the truck frame when the brakes are applied acts in a substantially horizontal direction so as to thereby not effect to any material degree the springing or free vertical movement of the truck frame with respect to the truck wheel 4 and it will also be evident that such movement and the vertical position of the truck frame 1 with respect to the truck wheel 4 will have substantially no effect upon the positioning and operation of the brake elements.

Summary

In both of the above described embodiments of the invention it will be noted that the brake mechanisms are compactly arranged immediately around the rotating member to be braked and are supported directly from unsprung parts of the vehicle truck, due to which the vertical positioning or vertical movement of the truck frame has substantially no effect upon the positioning and operation of the brake mechanisms and, conversely, the brake mechanisms at no time have any material effect upon the springing of the truck frame. Due to these novel arrangements the spacing of the brake elements 14 above the wheel can be made whatever degree is desired and will never be influenced by vertical movement of the truck frame, and as a consequence the clearance between the clasp arranged shoes 12 and 13 can also be fixed at any desired degree, which would be impossible were these elements carried by and movable with said frame.

In conventional truck design the brake rigging is usually carried by the truck frame or some other sprung portion of the truck in order to maintain the dead or unsprung weight of the truck to as low a degree as possible. The equivalent of this is obtained, as will be evident, in the brake mechanism shown in Figs. 1 to 3 of the drawings, since therein said mechanism is carried by the hanger springs 39 so that in this structure the dead or unsprung weight of the vehicle need be no greater than in conventional truck design. However, it is desired to point out that even in this embodiment the positioning and operation of the brake mechanism is entirely free of the truck frame 1 so that neither will have any adverse effect upon the other.

While two embodiments of the invention have been described in detail it is not the intention to limit its scope to these embodiments or otherwise than by the terms of the appended claims.

Having now described my invention, what I claim as new and desire to secure by Letters Patent, is:

1. A brake mechanism for a railway vehicle truck having sprung and unsprung parts and a rotatable member included in said unsprung parts and provided with an annular braking surface, said brake mechanism comprising at least three brake elements arranged around said surface in spaced relation with respect to each other and adapted to be moved into and out of braking engagement with said surface for controlling braking of said truck, actuating means for controlling the operation of said brake elements, and spring means carried by an unsprung part of said truck and connected to said brake elements for resiliently supporting same independently of the sprung parts of said truck.

2. A brake mechanism for a railway vehicle truck having sprung and unsprung parts and a rotatable member included in said unsprung parts and provided with an annular braking surface, said brake mechanism comprising at least three brake elements arranged around said surface in spaced relation with respect to each other and adapted to be moved into and out of braking engagement with said surface for controlling braking of said truck, actuating means for controlling the operation of said brake elements, support means carried by an unsprung part of said truck and connected to said brake elements for supporting same independently of the sprung parts of said truck, and means independent of said support means providing a substantially horizontally acting connection between said brake mechanism and truck for securing said brake mechanism against rotation with said rotatable member.

3. A brake mechanism for a railway vehicle truck having sprung and unsprung parts and a rotatable member included in said unsprung parts and provided with an annular braking surface, said brake mechanism comprising at least three brake elements arranged around said surface in spaced relation with respect to each other and adapted to be moved into and out of braking engagement with said surface for controlling braking of said truck, actuating means for controlling the operation of said brake elements, support means carried by an unsprung part of said truck and connected to said brake elements for supporting same independently of the sprung parts of said truck, and means independent of said support means providing a substantially horizontally acting connection between said brake mechanism and a sprung part of said truck for securing said brake mechanism against rotation with said rotatable member.

4. A brake mechanism for a railway vehicle truck having sprung and unsprung parts and a rotatable member included in said unsprung parts and provided with an annular braking surface, said brake mechanism comprising at least three brake elements arranged around said surface in spaced relation with respect to each other and adapted to be moved into and out of braking engagement with said surface for controlling braking of said truck, actuating means for controlling the operation of said brake elements, support means carried by an unsprung part of said truck and connected to said brake elements for supporting same independently of the sprung parts of said truck, and means independent of said support means providing a substantially horizontally acting connection between said brake mechanism and an unsprung part of said truck for securing said brake mechanism against rotation with said rotatable member.

5. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, resilient hanger means carried by an unsprung part of said truck and connected to said two brake elements for resiliently supporting same independently of said truck frame, means carried by said two brake elements for supporting said third brake element, and actuating means for controlling the braking operation of said brake elements.

6. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, resilient hanger means carried by an unsprung part of said truck and connected to said two brake elements for supporting same independently of said truck frame, means for actuating said two brake elements for braking said assembly, and means for supporting said third brake element from said hanger means and operative to actuate said third brake element to brake said assembly upon operation of said two brake elements to brake said assembly.

7. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, a resilient hanger for resiliently supporting each of said two brake elements independently of said truck frame, the two hangers being disposed at opposite sides of said assembly and being supported by an unsprung part of said truck, means carried by said hangers for supporting the third brake element, and means for controlling the operation of said brake elements to brake said assembly.

8. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, said truck having an unsprung part carried by said assembly, a spring at each of the opposite sides of said assembly carried by said unsprung part and supporting the brake element at that side of said assembly independently of said truck frame, means carried by the two springs for supporting said third brake element, and means for controlling the operation of said brake elements to brake said assembly.

9. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, hanger means carried by an unsprung part of said truck and connected to said two brake elements for supporting same in dependently of said truck frame, means for actuating said two brake elements for breaking said assembly, and rigid link-line means connecting said two brake elements to said third brake element for normally supporting said third brake element independently of said frame and for actuating said third brake element to brake said assembly upon operation of said two brake elements to brake said assembly.

10. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, a dead brake lever operatively connected to one of said two brake elements, a live brake lever operatively connected to the other of said two brake elements, an unsprung member carried by said assembly, hanger means carried by said unsprung member for supporting said two brake elements and said levers, supporting and actuating means for said third brake element connected to said levers for supporting said third brake element from said hanger means, and means for operating said levers and support and actuating means to effect movement of all of said brake elements in the direction of said assembly for effecting braking thereof.

11. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, an actuating element operatively connected to each of said two brake elements, an unsprung member carried by said assembly, resilient hanger means carried by said unsprung member for resiliently supporting said two brake elements and the two actuating elements, support means connecting said third brake element to said actuating elements for normally supporting said third brake element from said hanger means, and means for operating said actuating elements and support means to effect movement of all of said brake elements in a direction to effect braking of said assembly.

12. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, a dead brake lever operatively connected to one of said two brake elements, a live brake lever operatively connected to the other of said two brake elements, an unsprung member carried by said assembly, hanger means carried by said unsprung member for supporting said two brake elements and said levers, a toggle mechanism operatively connected at its opposite ends to said levers and at its knee to said third brake element for normally supporting said third brake element from said hanger means, and means for operating said levers and toggle mechanism to effect movement of all of said brake elements in the direction of said assembly to effect braking thereof.

13. A brake mechanism for a wheel and axle assembly of a railway vehicle truck having a truck frame carried by said assembly and capable of movement relative to said assembly in a vertical direction, said brake mechanism comprising at least three friction brake elements, two of which are arranged at opposite sides of said assembly in clasp relation and the third of which is arranged above said assembly on the vertical center-line thereof, a dead brake lever operatively connected to one of said two brake elements, a live brake lever operatively connected to the other of said two brake elements, an unsprung member carried by said assembly, hanger means carried by said unsprung member for supporting said two brake elements and said levers, support and actuating means for said third brake element connected to said levers for supporting said third brake element from said hanger means, said dead lever having a fulcrum connection with said unsprung member, and a brake cylinder device carried by said frame and connected to said live lever for effecting the operation of both of said levers and said support and actuating means to effect movement of all of said brake elements in the direction of said assembly for braking same, the connection between said brake cylinder device and live lever providing for vertical movement of said brake cylinder device relative to said brake mechanism.

14. A brake mechanism for a wheel and axle assembly of a railway vehicle truck having a truck frame carried by said assembly and capable of movement relative to said assembly in a vertical direction, said mechanism comprising at least three brake elements two of which are arranged at opposite sides of said assembly in clasp relation and the third of which is arranged above said assembly on the vertival center-line thereof, an unsprung member carried by said assembly, means carried by said unsprung member and connected to said two brake elements for supporting same independently of said truck frame, live and dead brake levers operatively connected to said two brake elements for effecting operation thereof to brake said assembly, means connecting said third brake element to said two brake elements for supporting said third brake element and for effecting operation of said third brake element to brake said assembly upon braking operation of said two brake elements, said dead lever having a fulcrum connection with said truck frame providing for movement of said frame relative to said dead lever in a vertical direction, and a substantially horizontally acting torque member connected at one end to said frame and at the opposite end to said third brake element for holding said brake mechanism against turning with said assembly and providing for movement of said frame relative to said third brake element in a vertical direction.

15. A brake mechanism for a wheel and axle assembly of a railway vehicle truck having a truck frame carried by said assembly and capable of movement relative to said assembly in a vertical direction, said mechanism comprising at least three brake elements two of which are arrranged at opposite sides of said assembly in clasp relation and the third of which is arranged above said assembly on the vertical center-line thereof, an unsprung member carried by said assembly, means carried by said unsprung member and connected to said two brake elements for supporting same independently of said truck frame, live and dead brake levers operatively connected to said two brake elements for effecting operation thereof to brake said assembly, means connecting said third brake element to said two brake elements for supporting said third brake element and for effecting operation of said third brake element to brake said assembly upon braking operation of said two brake elements, said dead lever having a fulcrum connection with said unsprung member, and a substantially horizontally acting torque member connecting said third brake element with said unsprung member operative to hold said brake mechanism against rotation with said assembly and providing for movement of said frame relative to said third brake element in a vertical direction.

16. A brake mechanism for a wheel and axle assembly of a railway vehicle truck having a journal bearing for said axle and truck frame resiliently supported from said bearing and capable of movement relative to said assembly in a vertical direction, said mechanism comprising at least three brake elements two of which are arranged at opposite sides of said assembly in clasp relation and the third of which is arranged above said assembly on the vertical center-line thereof, actuating means operatively connecting said brake elements together for controlling the operation thereof to brake said assembly, means for controlling the operation of said actuating means, resilient means carried by said journal bearing and operative independently of said frame for supporting said brake elements and actuating means and means connecting said brake mechanism to said frame and operative in a substantially horizontal direction to secure said brake mechanism against rotation with said assembly during braking thereof.

17. A brake mechanism for a wheel and axle assembly of a railway vehicle truck having a journal bearing for said axle and a truck frame resiliently supported from said bearing and capable of movement relative to said assembly in a vertical direction, said mechanism comprising at least three brake elements two of which are arranged at opposite sides of said assembly in clasp relation and the third of which is arranged above said assembly on the vertical center-line thereof, resilient means carried by said journal bearing for supporting said two brake elements independently of said frame, support and actuating means connecting said two brake elements to said third brake element for supporting said third brake element, means connected to said two brake elements for effecting operation thereof to brake said assembly and for also effecting operation of said support and actuating means to effect operation of said third brake element to also brake said assembly and means connecting said third brake element to said frame and operative in a substantially horizontal direction during braking to hold said mechanism against rotation with said assembly.

18. A brake mechanism for a wheel and axle assembly of a railway vehicle truck having a journal bearing for said axle and a truck frame resiliently supported from said bearing and capable of movement relative to said assembly in a vertical direction, said mechanism comprising at least three brake elements two of which are arranged at opposite sides of said assembly in clasp relation and the third of which is arranged above said assembly on the vertical center-line thereof, actuating means operatively connecting said brake elements together for controlling the operation thereof to brake said assembly, means for controlling the operation of said actuating means, bracket-like means rigidly secured to and movable with said journal bearing, and hanger means carried by said bracket-like means supporting said brake elements and actuating means independently of said truck frame.

19. A brake mechanism for a wheel and axle assembly of a railway vehicle truck having a journal bearing for said axle and a truck frame resiliently supported from said bearing and capable of movement relative to said assembly in a vertical direction, said mechanism comprising at least three brake elements two of which are arranged at opposite sides of said assembly in clasp relation and the third of which is arranged above said assembly on the vertical center-line thereof, actuating means operatively connecting said brake elements together for controlling the operation thereof to brake said assembly, means for controlling the operation of said actuating means, bracket-like means rigidly secured to and movable with said journal bearing, and spring means carried by said bracket-like means supporting said brake elements and actuating means independently of said truck frame.

20. A brake mechanism for a wheel and axle assembly of a railway vehicle truck having a journal bearing for said axle, a truck frame capable of movement vertically relative to said assembly, and an equalizer bar carried by and movable with said journal bearing and supporting said truck frame, said mechanism comprising at least three brake elements, two of which are arranged at opposite sides of said assembly in clasp relation and the third of which is arranged above said assembly on the vertical center-line thereof, actuating means operatively connecting said brake elements together for controlling the braking operation thereof, means for controlling the operation of said actuating means, and hanger means connected to and carried by said equalizer bar for supporting said brake elements and actuating means independently of said truck frame.

21. A brake mechanism for a wheel and axle assembly of a railway vehicle truck having a journal bearing for said axle, a truck frame capable of movement vertically relative to said assembly, and an equalizer bar carried by and movable with said journal bearing and supporting said truck frame, said mechanism comprising at least three brake elements, two of which are arranged at opposite sides of said assembly in clasp relation and the third of which is arranged above said assembly on the vertical center-line thereof, actuating means operatively connecting said brake elements together for controlling the braking operation thereof, means for controlling the operation of said actuating means, and a hanger at each side of said assembly connected to said equalizer bar and to the clasp brake element at said side of said assembly, the two hangers supporting all of said brake elements and with actuating means independently of said truck frame.

22. A brake mechanism for a wheel and axle assembly of a railway vehicle truck having a journal bearing for said axle, a truck frame capable of movement vertically relative to said assembly, and an equalizer bar carried by and movable with said journal bearing and supporting said truck frame, said mechanism comprising at least three brake elements, two of which are arranged at opposite sides of said assembly in clasp relation and the third of which is arranged above said assembly on the vertical center-line thereof, hanger means supported by said equalizer bar and connected to said two brake elements for supporting same independently of said truck frame, means for actuating said two brake elements for braking said assembly, and means connecting said two brake elements to said third brake element for normally supporting same and operative upon braking operation of said two brake elements to effect operation of said third brake element to also brake said assembly.

23. A brake mechanism for a wheel and axle assembly of a railway vehicle truck having a journal bearing for said axle, a truck frame capable of movement vertically relative to said assembly, and an equalizer bar carried by and movable with said journal bearing and supporting said truck frame, said mechanism comprising at least three brake elements, two of which are arranged at opposite sides of said assembly in clasp relation and the third of which is arranged above said assembly on the vertical center-line thereof, live and dead brake levers connected to said two brake elements for controlling the braking operation thereof, hanger means supported by said equalizer bar carrying said two brake elements and said levers independently of said frame, and means operatively connecting said third brake element to said hangers and levers for supporting same and for effecting braking operation of said third brake element upon braking operation of said two brake elements.

24. A brake mechanism for a wheel and axle assembly of a railway vehicle truck having a journal bearing for said axle, a truck frame capable of movement vertically relative to said assembly, and an equalizer bar carried by and movable with said journal bearing and supporting said truck frame, said mechanism comprising at least three brake elements, two of which are arranged at opposite sides of said assembly in clasp relation and the third of which is arranged above said assembly on the vertical center-line thereof, live and dead brake levers connected to said two brake elements for controlling the braking operation thereof, hanger means supported by said equalizer bar carrying said two brake elements and said levers independently of said frame, and means operatively connecting said third brake element to said hangers and levers for supporting same and for effecting braking operation of said third brake element upon braking operation of said two brake elements, said dead lever having a fulcrum connection with said equalizer bar, and means providing a torque connection between said brake mechanism and equalizer bar for holding said brake elements against rotation with said assembly.

RALPH T. WHITNEY.

CERTIFICATE OF CORRECTION.

Patent No. 2,218,601. October 22, 1940.

RALPH T. WHITNEY.

It is hereby certified that error appears in the printed specification of the above numbered patent requiring correction as follows: Page 9, second column, line 44, claim 21, for the word "with" read --said--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.